United States Patent
McCormack et al.

(10) Patent No.: US 6,178,213 B1
(45) Date of Patent: Jan. 23, 2001

(54) ADAPTIVE DATA RECOVERY SYSTEM AND METHODS

(75) Inventors: Gary D. McCormack, Tigard; Ronald F. Talaga, Jr., Lake Oswego; Ian A. Kyles, West Linn; Angus J. McCamant, Aloha, all of OR (US)

(73) Assignee: Vitesse Semiconductor Corporation, Camarillo, CA (US)

( * ) Notice: Under 35 U.S.C. 154(b), the term of this patent shall be extended for 0 days.

(21) Appl. No.: 09/139,252

(22) Filed: Aug. 25, 1998

(51) Int. Cl.⁷ .................................................. H04L 7/00
(52) U.S. Cl. .......................... 375/355; 375/371; 370/503; 714/707
(58) Field of Search ................................. 375/227, 324, 375/354, 355, 371, 373, 376; 714/704, 707; 370/503, 516, 517

(56) References Cited

U.S. PATENT DOCUMENTS

| | | | |
|---|---|---|---|
| 4,097,697 | 6/1978 | Harman | 714/704 |
| 4,777,640 | 10/1988 | Turner et al. | 375/118 |
| 4,823,360 | 4/1989 | Tremblay et al. | 375/214 |
| 5,359,630 | 10/1994 | Wade et al. | 375/106 |
| 5,481,563 | 1/1996 | Hamre | 375/226 |
| 5,535,252 | * 7/1996 | Kobayashi | 375/371 |
| 5,598,443 | 1/1997 | Poeppleman | 375/359 |
| 5,696,800 | 12/1997 | Berger | 375/361 |
| 5,719,908 | 2/1998 | Greeff et al. | 375/376 |
| 5,757,857 | 5/1998 | Buchwald | 375/271 |
| 5,796,777 | * 8/1998 | Terlep et al. | 375/227 |
| 5,878,088 | * 3/1999 | Knutson et al. | 375/324 |
| 5,896,391 | 4/1999 | Solheim et al. | 714/704 |
| 5,991,346 | * 11/1999 | Lu | 375/355 |

* cited by examiner

*Primary Examiner*—Stephen Chin
*Assistant Examiner*—Chieh M. Fan
(74) *Attorney, Agent, or Firm*—Christie, Parker & Hale, LLP

(57) ABSTRACT

A microprocessor controlled data recovery unit with an adjustable sampling and signal comparison level. The data recovery unit includes a data channel and a monitor channel. The monitor channel samples an incoming data stream in a varying manner. The results of the sampling in the monitor channel are used to adjust the sampling and comparing of the signal in the data channel. The data recovery unit includes a PLL based clock recovery unit in one embodiment, and in another embodiment the clock signal is derived by the microprocessor.

20 Claims, 7 Drawing Sheets

ADAPTIVE DATA RECOVERY SYSTEM AND METHODS

BACKGROUND OF THE INVENTION

This invention relates generally to digital data communication systems, and more particularly to recovering clock signals and digital data from a serial data signal.

Modern data communication systems are required to accurately transmit and receive digital information at high data transmission rates. The digital information is often transmitted great distances over a variety of communication mediums such as electrically conducting wires and, commonly now, optical fibers. Great demands as to speed and reliability are placed on these systems. One measure of reliability of such systems is the bit error rate (BER) of the system, and modern communication systems are required to have exceedingly low bit error rates.

When a receiving unit in a data communication system receives a signal, generally an electrical or optical signal, containing digital information, the receiving unit must recover the digital information from the signal. In other words, if a transmitter transmits a signal containing information corresponding to a particular bit sequence, then the receiving unit must recover the particular bit sequence from the received signal.

In addition, often the received data signal does not include a separate clock signal or other direct indication of the demarcation within the signal between the separate bits making up the signal. For example, when bit sequences are transmitted in a non-return to zero (NRZ) format, a logic 1 bit is indicated by a signal at a first energy level, and a logic 0 bit is indicated by a signal at a second (usually lower) energy level. The clock signal used to define the bit sequence by demarcating the bits within the sequence is not explicitly transmitted to the receiving unit. Data formats, such as NRZ, which do not provide inherent demarcation between bits in the data stream are often preferred because such formats have greater bandwidth as clock information is not explicitly required to be transmitted. Accordingly, receiving units must generally be able to recover clock information from the received signal, and then use that recovered clock information to determine the bit sequences contained in the received signal.

Systems for recovering clock and data information from data communicated according to data formats such as an NRZ format are known. Often such systems use a phase locked loop (PLL) to determine a clock signal corresponding to the clock used to generate the data stream. PLLs use a clock generator generating a clock signal at what is hoped to be the same frequency as the clock frequency of the transmitter, and adjusts the phase of the generated clock signal to form a phase adjusted clock signal based on information implicitly contained in the data signal. Periodic transitions, generally positive edge transitions, of the phase adjusted clock signal are used as timing points at which the data signal is sampled by comparing the data signal to a set energy level. If the energy level, usually in volts, is above the set energy level a logic 1 bit is placed in the bit sequence. If the energy level is below the set energy level a logic 0 is placed in the bit sequence.

FIG. 1 illustrates dual semi-idealized digital waveforms of data signals. A y-axis represents voltage of the data signals, and an x-axis represents time. As illustrated, a waveform of a first data signal 11a represents a binary sequence of alternating logic 1s and 0s. A waveform of a second data signal 11b represents the complement of the alternating binary sequence of the first binary sequence. The waveforms deviate from ideal waveforms in that each has a finite rise time and fall time when transitioning to and from a logic level 1 and a logic level 0.

The waveforms are divisible over time into a number of data cells 15a–d. Each of the data cells 15a–d represents one bit of data in a sequence of bits. In order to reconstruct the transmitted binary sequence the data signal is sampled and compared once for each data cell, generally at the expected midpoint in time of the data cell. Sampling is performed at defined intervals, generally in what is expected to be the middle of the period of an idealized data cell. Comparing is accomplished by comparing an energy level, generally a voltage, of the data signal with a pre-defined energy level, or voltage, which is generally in the middle of the expected range of energy levels. Thus, if the first data signal 11a is sampled once in each of the data cells 15a–d at times 19a–d using a voltage reference 17, the resulting bit pattern is 0101. Similarly sampling the second data signal results in a bit pattern of 1010.

Such systems are prone to errors, however. Slight differences in frequency between the transmitter clock and the clock generator of the receiving unit may lead to data recovery errors over time, or at least require periodic reacquisition of the correct phase adjusted clock signal, with a loss of bandwidth during the reacquisition period. In addition, deviations from an ideal transmitted data signal and distortions in transmitted signals, whether generated by properties of the transmitter, the communication medium, or otherwise, may result in data recovery errors. There are many causes of such deviations and distortions, and the deviations may change from transmitted bit to transmitted bit as well as exhibit both drift and an increase in the magnitude of the deviations over time as components age.

The transmitter may transmit signals that deviate from the ideal in terms of rise time, fall time, and energy levels. These deviations may vary from transmitter to transmitter, and even over time for a single transmitter. To an extent, these deviations may also vary from bit to bit for a single transmitter. Additionally, the transmitter and receiving unit may not have clocks perfectly aligned in frequency or phase, thus increasing the difficulty in the translation. Further, properties of the communication medium may distort the transmitted signals, and a receiver utilized by the receiving unit may also cause distortion of the signals. Accordingly, systems and methods for increasing communication system reliability in view of such problems are desirable.

SUMMARY OF THE INVENTION

The present invention therefore provides systems and methods for providing clock and data recovery from digital communication signals. The one embodiment the present invention compares is a data recovery system. A data recovery system includes means for receiving a data signal and means for splitting the data signal into a data channel signal and a monitor channel signal. The data channel signal is digitized by a digitizer to obtain a data out signal, and the monitor channel signal is digitized by a digitizer to obtain a monitor out signal. The data out signal and the monitor out signal are compared using comparison means, other comparison means providing a result which is used to adjust the digitization of the data channel signal. The digitization of the signals occurs by comparing the signals to reference energy levels to provide an intermediate signal, and periodically sampling the intermediate signal. The comparing and sampling of the monitor channel signal is varied to determine the edges of a data eye of a data cell, and the edges of the data cell are used to determine a center of gravity of the data eye to be used as a digitization point for the data signal in the data channel. The varying of the digitization point of the monitor channel is accomplished by changing the reference energy level for the monitor channel as well as changing the phase of a clock signal used for periodically sampling the intermediate signal. In one embodiment, the edges of the data eye are determined when a bit error rate between a data channel signal and the monitor channel out signal is greater than a predefined value.

In one embodiment a comparator is used as comparison means and a latch or a flip flop is used as a sampling means. Digital to analog convertors under the control of a controller, processor, or microprocessor generate a reference voltage for use by a comparator. Similarly, a controllable delay element, under the control of the controller, processor, or microprocessor, provides a phase adjusted version of a master clock signal which is used to vary a sampling point as a clock signal to the latch.

Many of the attendant features of this invention will be more readily appreciated as the same becomes better understood by reference to the following detailed description and considered in connection with the accompanied drawings in which like reference symbols designate like parts throughout.

DETAILED DESCRIPTION

Figure 1:
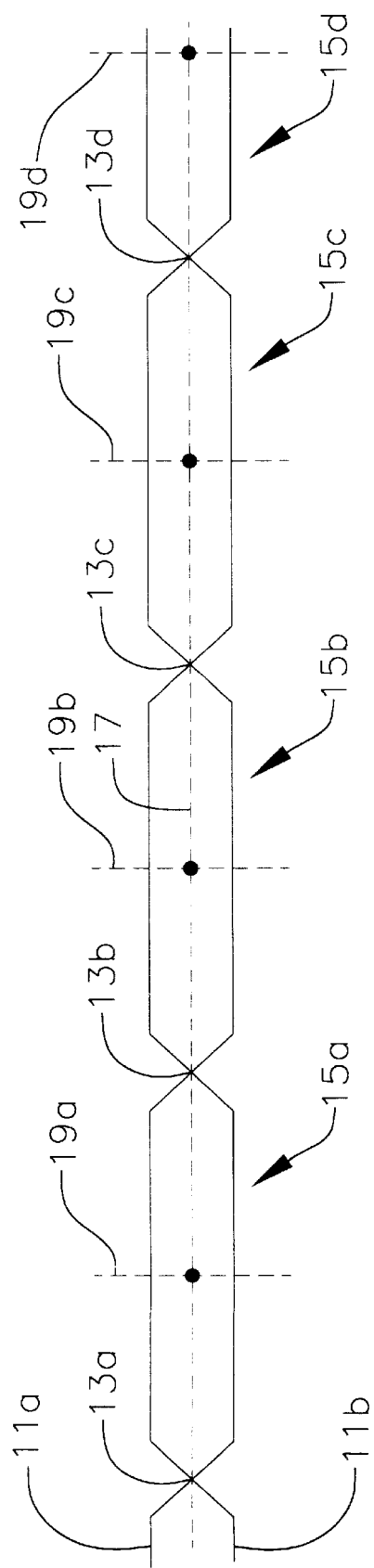
FIG. 1 illustrates a semi-idealized incoming data waveform.
Figure 2:
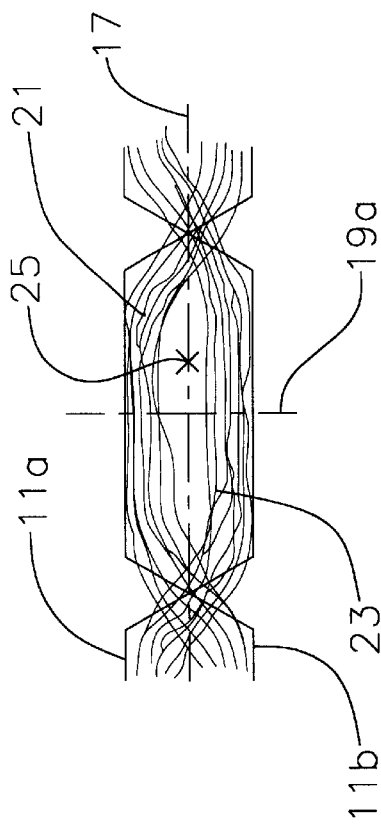
FIG. 2 illustrates a data cell of the semi-idealized waveform of FIG. 1, along with a data-eye of an expected actual waveform.

FIG. 2 illustrates a possible actual data-eye of a single data cell. The data eye is formed by superimposing waveforms of a plurality of data signals over a single data cell. A first plurality of varying data signals 21 are data signals having the same bit sequence as the first data signal 11a, and a second plurality of varying data signals 23 are data signals having a bit sequence corresponding to the bit sequence of the second data signal 11b. As illustrated, the plurality of data signals vary substantially from the data signals. The plurality of data signals generally to do not reach the expected upper voltage level, or the expected lower voltage level. The plurality of data signals additionally exhibit increased rise times, decreased steady state times, and increased fall times. In addition to varying from the data signals, the plurality of data signals vary from each other, having different waveforms. Moreover, the variations in rise time, fall time, and steady state time are not symmetric. That is, the center of the data cell is not the point most equidistant from all of the waveforms making up the data-eye. Accordingly, sampling and comparing the center of the idealized data-eye will not result in the lowest likelihood that a particular data bit will be correctly recovered, and therefore is not expected to result in the lowest bit error rate.

Figure 3:
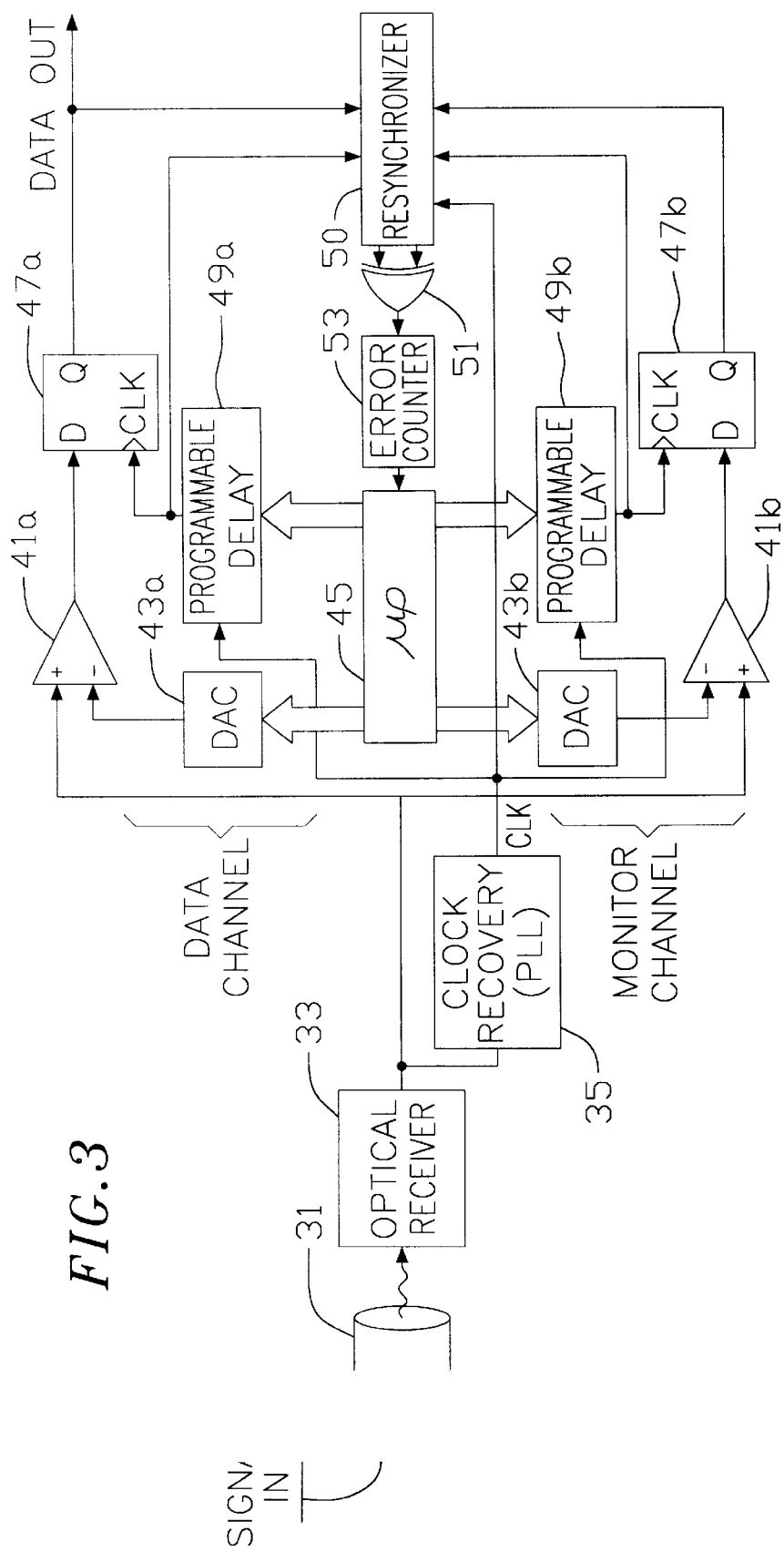
FIG. 3 illustrates a semi-schematic block diagram of a receiving unit of the present invention for obtaining digital data from an incoming data stream transported over a fiber optic cable.

FIG. 3 illustrates a semi-schematic of a clock and data recovery unit of the present invention. A data signal is transmitted over a fiber optic cable 31 by a transmitter (not shown). The fiber optic cable is coupled to an optical receiver 33. The optical receiver receives the light transmissions transmitted by the fiber optic cable and converts those light transmissions into electrical signals. Fiber optic cables and optical receivers are well known in the art, and are widely available from a variety of sources. In some communication networks wavelength division multiplexing is used in which signals corresponding to the input optical signal are comprised of a plurality of signals each transmitted at differing wavelengths, with the plurality of signals transmitted simultaneously over the same optical fiber. When such signals are received by the optical receiver the signals require wavelength demultiplexing. Apparatus and methods for doing so are well known in the art. Accordingly, for ease of further description, it will be assumed that the input optical signal comprises a single data signal. Generally, the fiber optic cable and optical receiver unit are not components of clock and data recovery units. For purposes of clarity of description, however, they are included in FIG. 3 and in other figures described herein.

The optical receiver produces an optical receiver output signal which is provided to a PLL-based clock recovery unit (CRU) 35. The CRU determines a master clock signal (CLK) based on the optical receiver output signal and a reference clock signal in a manner similar to previously described.

The optical receiver output signal is also provided to data channel circuitry and monitor channel circuitry. The data channel circuitry samples and compares the output of the optical receiver to form a data out signal for use by a receiving system of which the clock and data recovery unit is a part. The monitor channel circuitry also samples and compares the output of the optical receiver. The purpose of the monitor channel circuitry, however, is to gather information regarding the optical receiver output signal. This information is provided to a controller, which uses the information to adjust the sampling and comparing by the data channel in order to minimize receiving unit bit error rates.

The data channel circuitry includes a data path comparator 41a which compares the signal generated by the optical receiver to a voltage threshold. The voltage threshold is generated by a data path digital-to-analog convertor 43a based on a bit pattern generated by a controller 45. The output of the data channel comparator 41a is provided to a data channel latch 47a as a data channel latch data input signal. The data channel latch 47a is also provided a data channel clock signal. When the data channel clock signal transitions from a logic 0 state to logic 1 state the data channel latch sets a data out signal to the same logic value as the data channel latch data input signal.

The data channel clock signal provided to the data channel latch 47a is generated by a data channel programmable delay element 49a. The data channel programmable delay element 49a receives the master clock signal generated by the CRU. The data programmable delay element delays the clock signal generated by the CRU as instructed by the controller.

The monitor channel circuitry forms a mirror image of the data channel circuitry. Accordingly, the monitor channel circuitry includes a monitor channel comparator 41b for comparing the optical receiver output signal with a voltage generated by a monitor channel digital-to analog convertor 43b. The monitor channel digital-to-analog convertor 43b is also under control of the microprocessor 45. The output of the monitor channel comparator 41b is provided to a monitor channel latch 47b. The monitor channel latch 47b is provided a monitor channel clock signal from a monitor channel programmable delay element 49b, which delays the clock signal generated by the CRU as commanded by the controller. When the monitor channel clock signal transitions from a logic 0 state to logic 1 state the monitor channel latch sets a monitor out signal to the same logic value as the monitor channel latch data input signal.

The data out signal, in addition to being provided to the receiving system for further use, is provided to a resynchronizer 50. The resynchronizer also receives the monitor out signal, the master clock signal, and the data and monitor channel clock signals. The resynchronizer correlates a data out signal and monitor out signal pair from a single data cell, cancels the skew between the two signals, and reclocks the signals to the master clock signal. The resychronizer therefore has as outputs a resynchronized data out signal and a resynchronized monitor out signal. The resynchronized signals are provided to an exclusive OR gate 51. Accordingly, the output of the XOR gate is a logic 1 when the resynchronized data out signal of the data channel path is not equal to the resynchronized monitor out signal of the monitor channel path. An inequality between the resynchronized data out signal and the resynchronized monitor out signal indicates that the two signals were sampled and compared on different sides of a transition in the optical receiver output signal. Accordingly, the output of the XOR gate can be used to determine the waveforms of data transitions in the received signal, and therefore determine the boundaries of the data eye for the system.

The output of the XOR gate is provided to an error counter 53. In one embodiment the error counter also receives the master clock signal. The error counter determines the number of bit errors occurring over a predefined period of time and provides that information, corresponding to a bit error rate between the data out signal and the monitor out signal, to the controller.

The controller, having control of the delays used to determine sampling points and of the voltages used as comparison references, is therefore able to determine the shape of the waveforms 21 and 23, and thus the shape of the data eye, of the optical receiver output signal.

This is accomplished by initially placing the compare and sample point at the expected middle of the data cell. Thereafter the compare and sample point is moved up in the data cell, i.e. the compare voltage is incrementally increased, until the bit error rate between the monitor out signal and the data out signal reaches a predefined level. The microprocessor stores this compare and sample point as one point defining the edge of the data eye. The compare and sample point for the monitor channel is then moved down in the data cell, i.e. the reference voltage is incrementally decreased, until the predefined bit error rate is reached. The compare and sample point is then once again placed at the expected middle of the data cell, and the sample point is phase shifted in time towards the left, i.e. the beginning, of the data cell. The process is then repeated for the right edge of the data cell, as well as each diagonal direction within the data cell. The microprocessor then uses the eight points in the data cell so located to determine a "center of gravity" of the data cell. The center of gravity of the data cell is then used by the microprocessor to determine the compare and sample point for use in the data channel.

By constantly repeating the above process, the receiving unit adaptively adjusts to time varying changes in the shape of the data eye.

Figure 4:
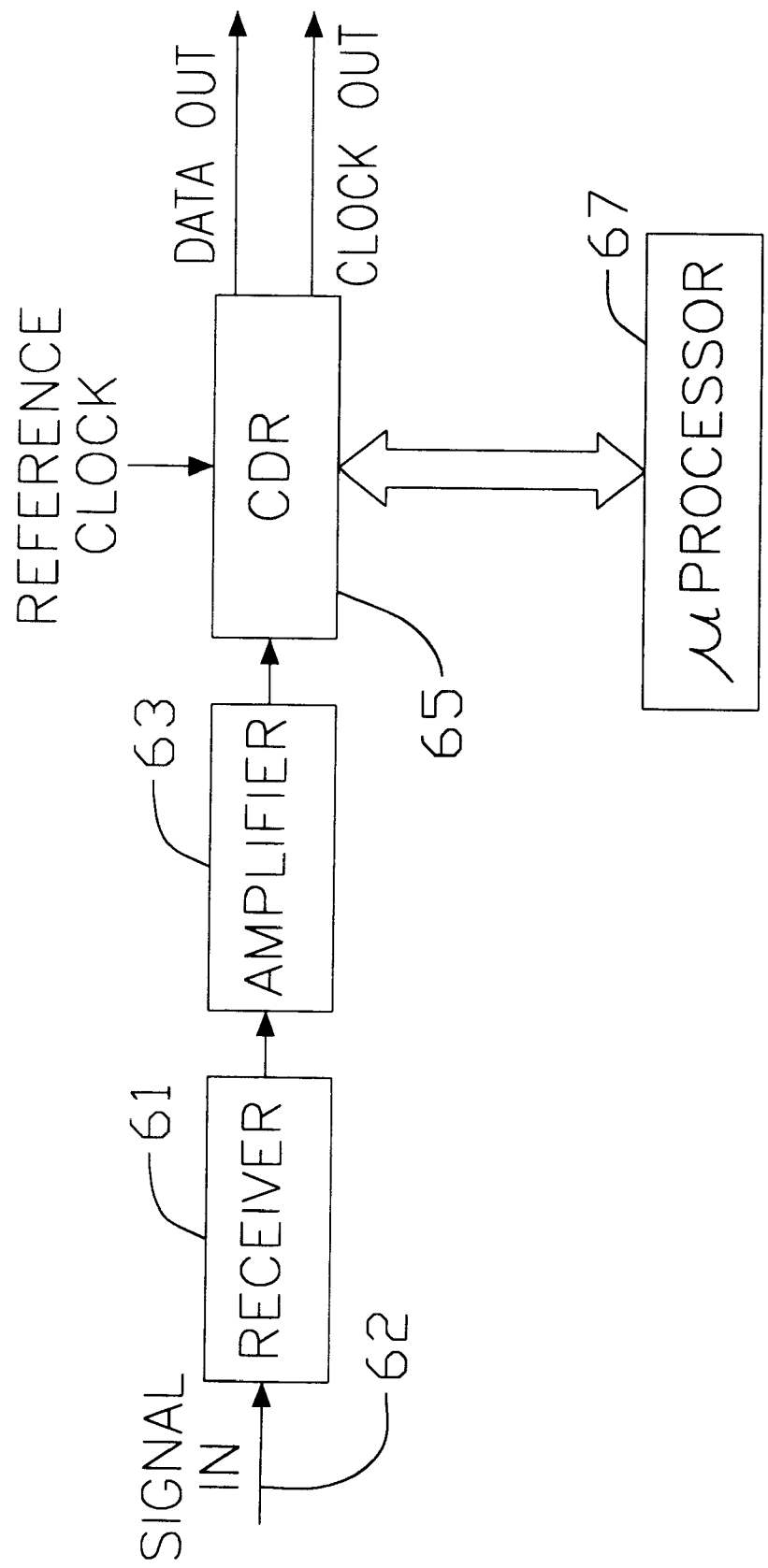
FIG. 4 illustrates a block diagram of a receiving unit of the present invention.

FIG. 4 illustrates a simplified block diagram of a receiving unit incorporating the present invention. An optical receiver 61 receives an input optical signal transmitted over an optical fiber 62. The input optical signal contains digital data, which may be formatted in accordance with Sonet or SDH standards. The optical receiver transforms the input optical signal to an electrical signal and provides the electrical signal to an amplifier 63. The amplifier amplifies the electrical signal to form an amplified electrical signal which is provided to a clock and data recovery unit (CDR) 65. The CDR additionally receives as an input a reference clock signal and receives and transmits a plurality of signals to and from a microprocessor 67. The CDR provides as outputs a data out signal and a clock out signal.

Figure 5:
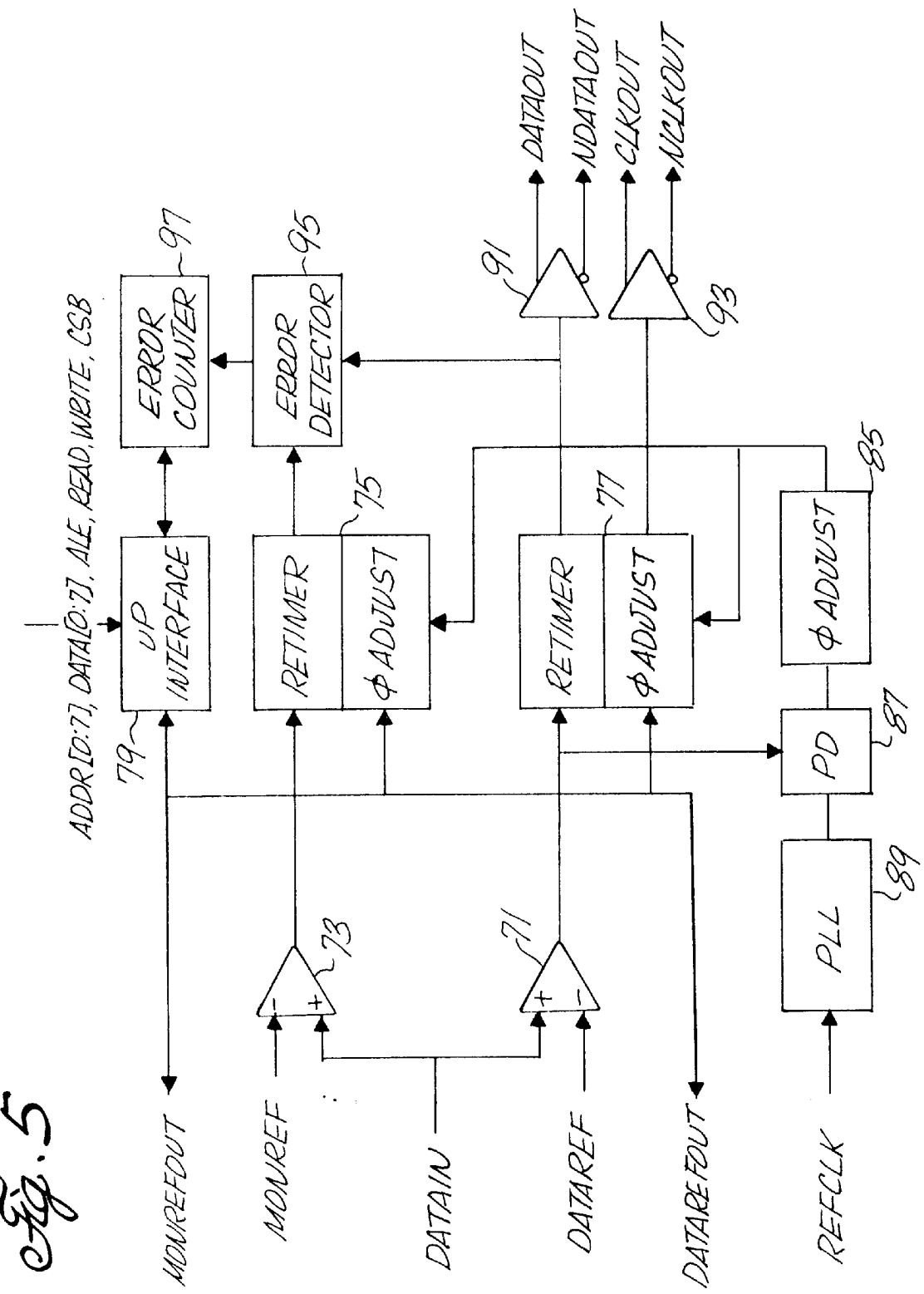
FIG. 5 illustrates a semi-schematic block diagram of a clock and data recovery unit of the receiving unit of FIG. 4.

FIG. 5 illustrates a block diagram of a clock and data recovery (CDR) unit of the system of FIG. 4. In one embodiment the CDR is provided in a single integrated circuit. The inputs to the CDR include a data-in input, a monitor reference input, a data reference input, a reference clock signal, and a microprocessor data transfer bus. The microprocessor data transfer bus is provided to a microprocessor interface 79. The microprocessor interface provides the microprocessor information related to CDR operation, and passes information from the microprocessor to the appropriate circuitry within the CDR. In one embodiment, the microprocessor interface also performs certain logic functions. These functions include the generation of the reference value and phase adjustment for the monitor channel digitization. Such functions may, in some implementations for systems with high data rates which require recentering every microsecond, necessarily be required to be executed at higher speeds than external microprocessors are capable of performing in addition to other duties placed on the microprocessor. Even in such systems, however, the microprocessor may modify the generation of the reference values and phase adjustments used in the monitor channel digitization. For example, the microprocessor may determine that a particular sequence of reference values and phase adjustments would more fully characterize the data-eye of a data cell than a sequence employed by the microprocessor interface and therefore command the microprocessor interface to use the particular sequence. Alternatively, the microprocessor instead may determine that the pattern of the sequence employed by the microprocessor interface is correct, but that the pattern requires an offset adjustment in voltage, phase, or both.

The data-in input corresponds to the optical receiver output signal. The data reference input signal and the monitor reference input signal are provided to a data channel 71 comparator and a monitor channel comparator 73. The data reference input and the monitor reference input are provided when the reference clock signal is provided to the PLL 89.

The outputs of the CDR include a data out (DATAOUT) signal, and its complement NDATAOUT, as well as a clock out (CLKOUT) signal and its complement, NCLKOUT. In addition, the CDR has as outputs a MONREFOUT signal and a DATAREFOUT signal. The MONREFOUT signal is generated by the microprocessor interface in response to commands from the external microprocessor, or, depending on the extent to which functions are implemented in the microprocessor interface, the microprocessor interface. The MONREFOUT signal corresponds to the desired voltage reference level for use in performing the monitor channel comparison of the data in signal. Based on the MONREFOUT signal, an external digital-to-analog converter provides the MONREF input signal. The DATAREFOUT signal is similar, but is used to generate the DATAREF input signal used in the data channel.

The data-in signal is provided to a data channel comparator 71 and a monitor channel comparator 73. The data channel comparator compares the voltage of the data-in signal with a data reference signal. The monitor channel comparator compares the data-in signal with a monitor reference signal.

The data channel comparator 71 and the monitor channel comparator 73 correspond to the data channel comparator and monitor channel comparator of FIG. 3, respectively. The PLL 89, along with a phase detecter PD 87 and phase adjuster 85 correspond to the PLL of FIG. 3. The PLL outputs a clock signal which is frequency locked to the REFCLK input signal. The clock signal output by the PLL is provided to the phase detector along with the output of the data channel comparator. The phase detector determines the phase of difference between the two input signals, and provides a phase adjust command signal to the phase adjuster 85. The phase adjuster uses the phase adjust command signal to output a master clock signal.

The phase adjusters of blocks 75 and 77 correspond to the programmable delay elements of FIG. 3, and the retimers of blocks 75 and 77 correspond to the latches of FIG. 3 and a single signal resynchronizer similar to the resynchronizer previously described.

The embodiment of FIG. 5 may be used with the microprocessor only periodically coupled to the CDR. That is, the microprocessor may be coupled to the CDR during an initial period to gather information and set a data channel compare and sample i.e., digitization, point. The CDR would thereafter operate with the data channel digitization point so set, until some time in the future when the microprocessor is recoupled to the CDR.

Figure 6:
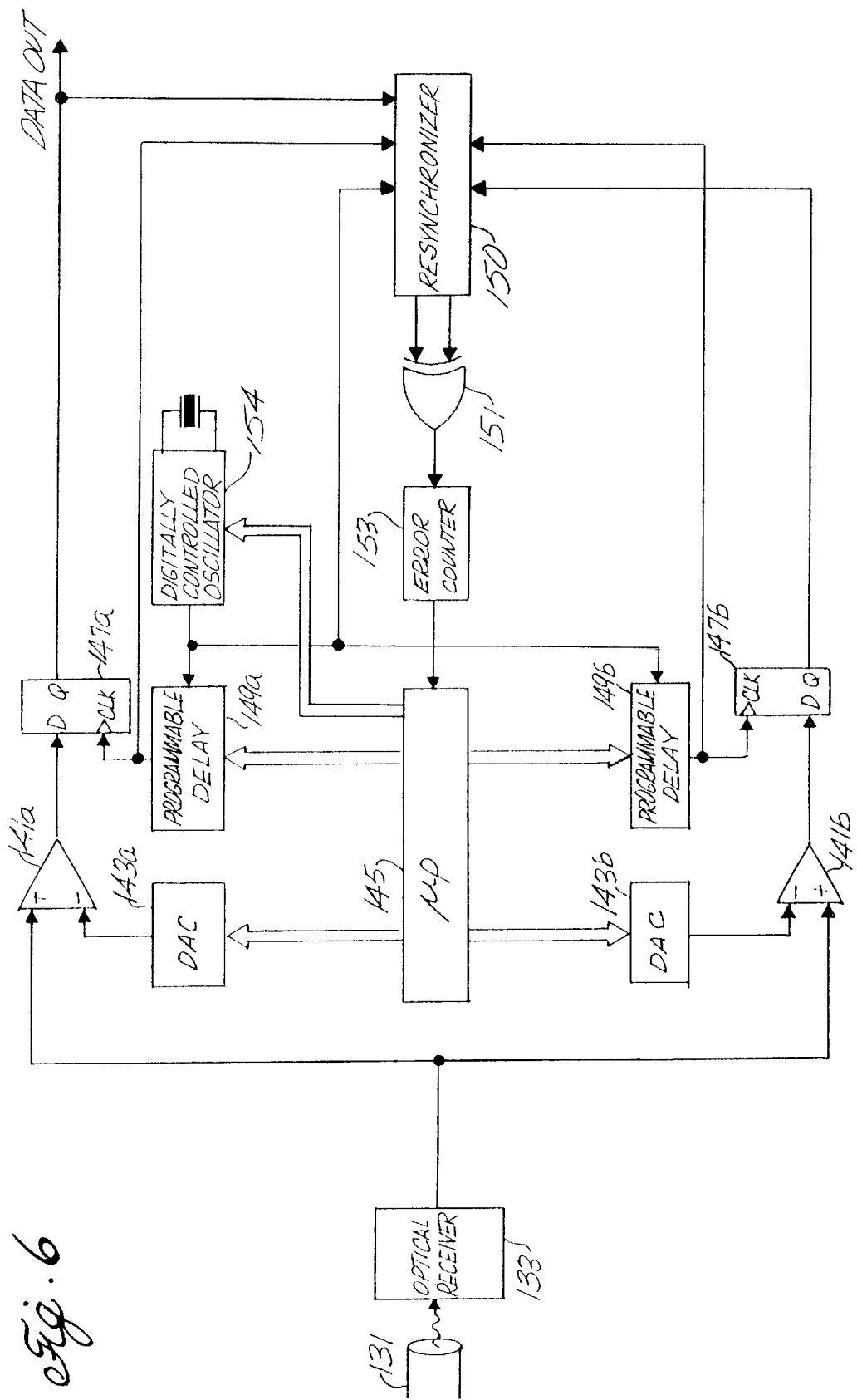
FIG. 6 illustrates a semi-schematic block diagram of an alternate embodiment of the receiving unit of the present invention.

FIG. 6 illustrates another embodiment of a data recovery unit of the present invention. An incoming data signal is transmitted over a fiber optic cable 131. The fiber optic cable is coupled to an optical receiver 133. The optical receiver receives a light transmission transmitted by the fiber optic cable and converts those light transmissions into an electrical signal. The electrical signal form a data-in signal. The data-in signal is provided to a data channel comparator 141a and a monitor channel comparator 141b. The data channel comparator and the monitor channel comparator are provided reference signals by data path digital-to-analog convertor 143a and monitor channel digital-to-analog convertor 143b, respectively. The output of the data channel comparator is provided to a data channel latch 147a. The output of the monitor channel comparator is provided to a monitor channel latch 147b. The input of the data channel latch is clocked to the output of the latch every time a clock signal provided by data channel programmable delay 149a goes high. Similarly, the input of the monitor channel latch is clocked to the output of the monitor channel latch whenever a clock signal provided by a monitor channel programmable delay 149b goes high.

All of the digital-to-analog convertors and programmable delays, whether for the data channel or the monitor channel, are under the control of a controller 145. The digital-to-analog convertors are directly controlled by the controller. The programmable delays adjust a clock signal, provided by a digitally controlled oscillator 154, under the control of the controller. The controller commands the digitally controlled oscillator to operate at a frequency corresponding to the frequency of the transmitting clock. In addition, as with component aging clocks sometimes exhibit frequency drift, the embodiment of FIG. 6, as with the other embodiments, provides increased system reliability with age.

The controller receives as an input a signal indicative of the bit error rate between the data path signal and the monitor path signal. The signal indicative of the bit error rate between the data path signal and the monitor path signal is formed by providing the data channel out signal and monitor channel out signal to a resynchronizer 150, which then provides a resynchronized data out signal and a resynchronized monitor out signal to an exclusive OR gate 151. The exclusive OR gate output is provided to an error counter 153. The error counter, which additionally receives the clock signal generated by the digitally controlled oscillator and a start command signal from the controller, is substantially similar to the error counter of FIG. 3. The error counter 153 of FIG. 5, however, begins recalculating the bit error rate between the monitor and data channels upon being commanded to do so by the controller via the start command signal, and stops recalculating the bit error rate upon completion of a predefined number of clock cycles. Thus, upon receipt of the start command the error counter resets a bit error accumulator, accumulating bit errors in the accumulator, and begins incrementing a fixed length counter every clock cycle. Once the counter reaches its upper limit a value maintained in the accumulator and the length of the counter are used to form an error counter output which provides a bit error rate indication. The error counter output is provided to the controller.

Figure 7:
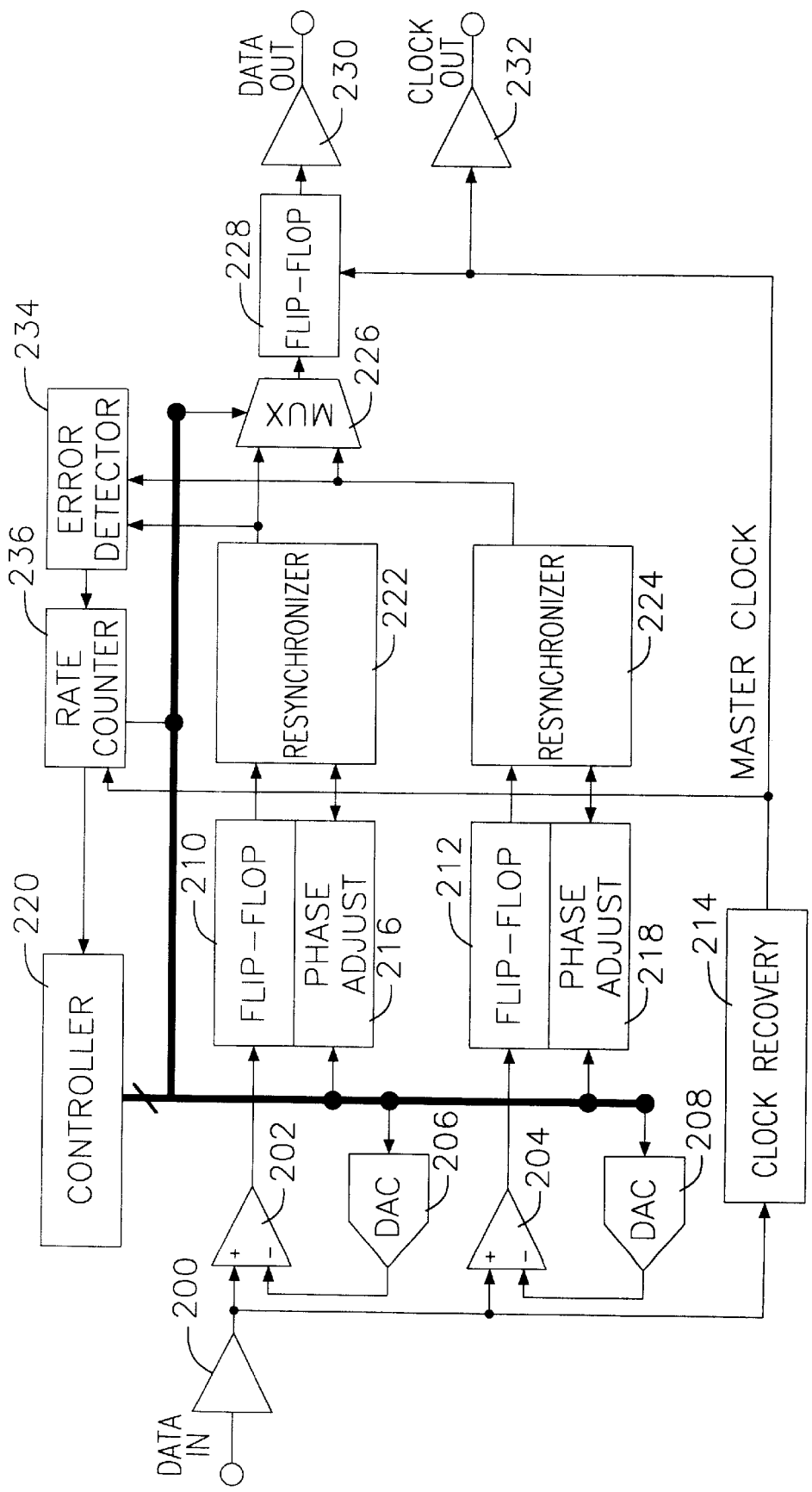
FIG. 7 illustrates a block diagram of another alternate embodiment of the invention.

FIG. 7 illustrates a block diagram of another embodiment of the invention. A data signal is provided to an input buffer 200. The input buffer serves to receive the data signal and drive the data signal to a first channel comparator 202, a second data channel comparator 204, and a clock recovery unit 214. The embodiment of FIG. 7, unlike the previously described embodiments, does not have a separate data channel and a separate monitor channel. Instead, first and second channels alternate as data channel and monitor channel. In effect, whenever a channel acting as the monitor channel determines a center of gravity of a data cell, the channel acting as the monitor channel has its compare and sample point placed at the center of gravity and thereafter acts as the data channel. The other channel, previously acting as the data channel, then serves as the monitor channel. Such an arrangement allows for greater accuracy as the circuitry of the receiving unit is likely to be nonideal, with small variations between the monitor path and data path channel circuitry. Such variations may result in small offsets between actual compare and sample points even when the commanded compare and sample points are identical, calibration of the two channels may minimize such offsets, but such is not required in the embodiment of FIG. 7.

The first channel comparator and the second channel comparator are provided a reference voltage from digital-to-analog convertors 206 and 208. The digital-to-analog convertors are under the control of a controller 220. The controller of the embodiment of FIG. 7, as illustrated, is an on-chip controller. The output of the input buffer is also provided to a clock recovery unit 214 which develops a master clock for the receiving unit. The master clock is adjusted by first channel phase adjuster 216 and second channel phase adjuster 218. The phase adjusters 216 and 218 provide signals which are phase adjusted versions of the master clock signal, with the amount of adjustment, or offset, accomplished according to the commands of the controller. The signals are provided as a clock input to a first channel flip flop 210 and second channel flip flop 212. The output of the flip flops 210,212 therefore correspond to the data out signal and monitor out signal of the previously described embodiments. Of course, at any given time either the first channel or the second channel may be acting as the data channel, with the other channel acting as the monitor channel.

The output of the flip flops 210 and 212, as well as the signals which are phase adjusted versions of the master clock signal, are additionally provided to resynchronizers 250a,b. The resynchronizers are also provided for the master clock signal. Because of the differences in the adjustment of the phase of the master clock signal for the two signals to the flip flops 210 and 212, the outputs of the two flip flops will be slightly skewed in time. The purpose of the resynchronizer therefore is to resynchronize the two signals, as well as to provide the error detector data and monitor signals derived from a single data cell. The outputs of the resynchronizers are also provided to a MUX 226. The MUX is provided a select signal by the controller, which maintains information as to which channel is serving as the data channel at any given point in time. The channel serving as the data channel output is selected by the MUX and passed to a flip flop 228. The flip flop 228 also receives the master clock signal. The output of the flip flop 228 is provided to an output buffer for driving a data out signal. The master clock signal is also provided to a output buffer 232 for driving a clock out signal.

In addition to being provided to the MUX, the outputs of the resynchronizer are also provided to an error detector 234. The error detector determines if differences exist between the outputs of the resynchronizer. The error detector provides a signal to a rate counter 236, which provides bit error rate information to the controller 220. The controller uses this bit error rate information as previously described to determine the center of gravity of data cells.

Figure 8:
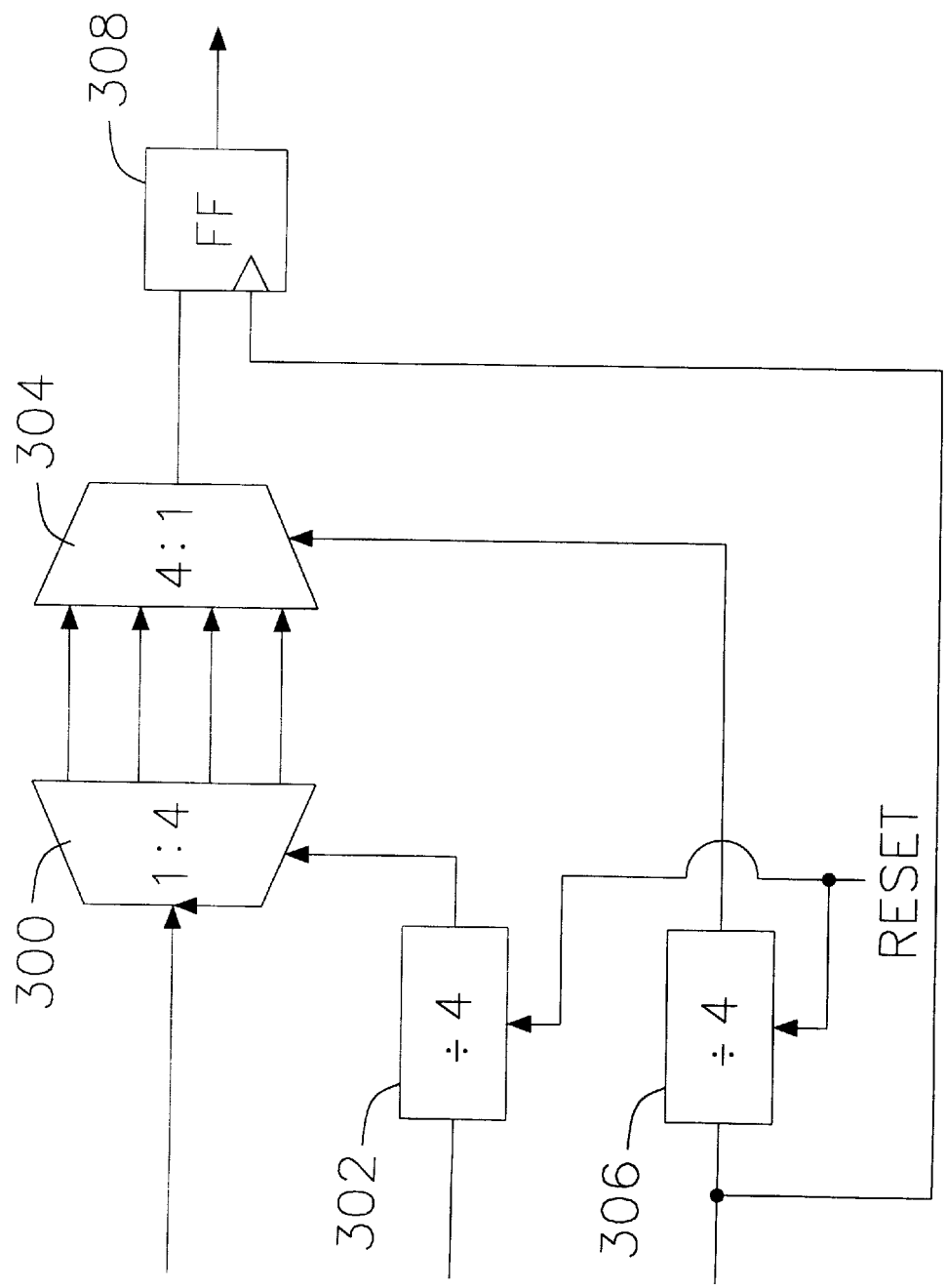
FIG. 8 illustrates a block diagram of a resynchronizer of the present invention.

FIG. 8 illustrates a resynchronizer block of the present invention. A data in signal, which corresponds to either the data out signal or the monitor out signal, is provided to a time division demultiplexor 300. The time division demultiplexor is a 1 to 4 demultiplexor. Therefore, the time division demultiplexor is a 1:4 time division DMUX. A time division demultiplexor selector signal is generated by passing a variable clock signal through a divide by 4 block 302. The variable clock signal corresponds to the phase adjusted master clock signal, from either the data channel or the monitor channel of the previously described embodiments. Accordingly, the demultiplexor selector signal is a clock signal corresponding to the phase adjusted master clock signal, but with a period four times as great.

The outputs of the time division DEMUX are provided to a time division multiplexor 304. The time division multiplexor uses a multiplexor selector signal generated by passing the master clock signal through a divide by 4 block 306. Accordingly the time division multiplexor selector signal corresponds to the master clock signal, but with a period four times as great. The divide by 4 blocks 302, 306 are also provided a reset signal. The reset signal causes the outputs of the divide by 4 block to reset in opposite phase. Accordingly, as the variable clock signal and the master clock signal correspond in frequency and are no more than one cycle apart in phase shift, after being reset the output of the divide by 4 blocks are approximately 180° out of phase, with no more than an additional phase shift corresponding to one period of the master clock cycle.

The output of the time division multiplexor is provided to a flip flop 308. The flip flop uses the master clock signal as a clock signal input. The output of the flip flop is therefore resynchronized to the master clock signal. In addition, as both the data out signal and a monitor out signal are each provided to a resynchronizer so described, the corresponding output from a pair of resynchronizers are guaranteed to each be derived from a compare and sample of the same data cell.

Accordingly, the present invention provides a system and methodology for recovering data from an incoming data stream.

Although this invention has been described in certain specific embodiments, many additional modifications and variations would be apparent to those skilled in the art. It is therefore to be understood that this invention may be practiced otherwise than is specifically described. Thus, the present embodiments of the invention should be considered in all respects as illustrative and not restricted, the scope of the invention to be indicated by the appended claims and their equivalents rather than the foregoing description.

What is claimed is:

1. A data recovery system comprising:
   means for receiving a data signal;
   means for splitting the data signal into a data channel signal and a monitor channel signal;
   means for digitizing the data channel signal to obtain a data out signal;
   means for digitizing the monitor channel signal to obtain a monitor out signal;
   means for comparing the data out signal and the monitor out signal;
   means for adjusting the means for digitizing the data channel signal, the means for adjusting being responsive to a signal generated by the means for comparing the data out signal and the monitor out signal;
   wherein the means for digitizing the data channel signal comprises means for comparing the data channel signal to a data channel reference energy level to produce an intermediate data channel signal and means for periodically sampling the intermediate data channel signal, and the means for digitizing the monitor channel signal comprises means for comparing the monitor channel signal to a monitor channel reference energy level to produce an intermediate monitor channel signal and means for periodically sampling the intermediate monitor channel signal.

2. The data recovery system of claim 1 further comprising means for adjusting the monitor channel reference energy level over time.

3. The data recovery system of claim 2 wherein the periodic sampling of the intermediate data channel signal is based on a period of a data channel clock signal and the periodic sampling of the intermediate monitor channel signal is based on a monitor channel clock signal which is offset in phase from the data channel clock signal.

4. The data recovery system of claim 3 further comprising means for changing the monitor channel clock signal to adjust the offset in phase between the monitor channel clock signal and the data channel clock signal.

5. The data recovery system of claim 4 wherein the result obtained in the step of comparing the data out signal and the monitor out signal is an indication of a bit error rate between the data out signal and the monitor out signal.

6. The data recovery system of claim 5 wherein the means for adjusting the monitor channel reference energy level over time comprises means for incrementally increasing the monitor channel reference energy level until the result obtained in the step of comparing the data out signal and the monitor out signal is greater than a predefined bit error rate and means for decreasing the monitor channel reference energy level until the result obtained in the step of comparing the data out signal and the monitor out signal is greater than a predefined bit error rate.

7. The data recovery system of claim 6 wherein the means for changing the monitor channel clock signal to adjust the offset in phase between the monitor channel clock signal and the data channel clock signal comprises means for incrementally increasing the offset in phase until the result obtained in the step of comparing the data out signal and the monitor out signal is greater than a predefined bit error rate and means for decreasing the offset in phase until the result obtained in the step of comparing the data out signal and the monitor out signal is greater than a predefined bit error rate.

8. A method for recovering digital data from a data signal comprising:

receiving a data signal;

splitting the data signal into a data channel signal and a monitor channel signal;

digitizing the data channel signal to obtain a data out signal;

digitizing the monitor channel signal to obtain a monitor out signal;

comparing the data out signal and the monitor out signal to obtain a result; and adjusting the digitizing of the data channel signal using the result obtained as part of the comparing of the data out signal and the monitor out signal;

wherein the step of digitizing the data channel signal comprises comparing the data channel signal to a data channel reference energy level to produce an intermediate data channel signal and periodically sampling the intermediate data channel signal, and the step of digitizing the monitor channel signal comprises comparing the monitor channel signal to a monitor channel reference energy level to produce an intermediate monitor channel signal and periodically sampling the intermediate monitor channel signal.

9. The method of claim 8 further comprising adjusting the monitor channel reference energy level over time.

10. The method of claim 9 wherein the periodic sampling of the intermediate data channel signal is based on a period of a data channel clock signal and the periodic sampling of the intermediate monitor channel signal is based on a monitor channel clock signal which is offset in phase from the data channel clock signal.

11. The method of claim 10 further comprising changing the monitor channel clock signal to adjust the offset in phase between the monitor channel clock signal and the data channel clock signal.

12. The method of claim 11 wherein the result obtained in the step of comparing the date out signal and the monitor out signal is an indication of a bit error rate between the data out signal and the monitor out signal.

13. The method of claim 12 wherein the adjusting the monitor channel reference energy level over time comprises incrementally increasing the monitor channel reference energy level until the result obtained in the step of comparing the data out signal and the monitor out signal is greater than a predefined bit error rate and decreasing the monitor channel reference energy level until the result obtained in the step of comparing the data out signal and the monitor out signal is greater than a predefined bit error rate.

14. The method of claim 13 wherein the changing the monitor channel clock signal to adjust the offset in phase between the monitor channel clock signal and the data channel clock signal comprises incrementally increasing the offset in phase until the result obtained in the step of comparing the data out signal and the monitor out signal is greater than a predefined bit error rate and decreasing the offset in phase until the result obtained in the step of comparing the data out signal and the monitor out signal is greater than a predefined bit error rate.

15. A data recovery system comprising:

a first comparator having as inputs a data signal and a first reference voltage and having as an output a first compared signal;

a first latch having as inputs the first compared signal and a first adjusted clock signal and having as an output a data out signal;

a second comparator having as inputs the data signal and a second reference voltage and having as an output a second compared signal;

a second latch having as inputs the second compared signal and a second adjusted clock signal and having as an output a monitor out signal;

a resychronizer to synchronize the data out signal and the monitor out signal to a single clock signal, the resynchronizer having as outputs synchronized data out and monitor out signals;

an XOR gate having as inputs the synchronized data out and monitor out signals and having as an output a XOR gate output;

a processor having as an input the XOR gate output and having as outputs a first reference voltage command signal, a first clock adjustment signal, a second reference voltage command signal, and a second clock adjustment signal, the processor modifying the second reference voltage command signal and the second clock adjustment signal over time and the processor modifying the first reference voltage command signal and the first clock adjustment signal based on the XOR gate output;

a first digital-to-analog converter having as an input the first reference voltage command signal and having as an output the first reference voltage;

a first controllable delay element having as inputs a reference clock signal and the first clock adjustment signal and having as an output the first adjusted clock signal;

a second digital-to-analog converter having as an input the second reference voltage command signal and having as an output the second reference voltage; and a second controllable delay element having as inputs the reference clock signal and the second clock adjustment signal and having as an output the second adjusted clock signal.

16. A method for recovering digital data from a data input signal, the data input signal containing a plurality of bits, each bit provided in a data cell, each data cell corresponding to the data input signal over a one period of a transmitting clock period, each data cell having a lower time boundary at the beginning of the one period and an upper time boundary at the end of the one period, the method comprising:

receiving the data input signal;

providing the data input signal to a first data channel and a second data channel;

digitizing the data input signal in the first data channel once each data cell using a first reference voltage and a first sampling clock to obtain first output bits;

digitizing the data input signal in the second data channel once each data cell using a second reference voltage and a second sampling clock to obtain second output bits, the second reference voltage and the second sampling clock being varied over time;

comparing the first output bits with the second output bits, each comparison made between bits derived from corresponding data cells;

determining a center gravity of the data cells.

17. The method of claim 16 further comprising setting the second reference voltage and the second sampling clock to cause digitization of the data input signal in the second data channel to occur at the center of gravity of the data cells.

18. The method of claim 16 further comprising setting the first reference voltage and the first sampling clock to cause digitization of the data input signal in the first data channel to occur at the center of gravity of the data cells.

19. The method of claim 17 further comprising varying the first reference voltage and the first sampling clock over time after determining the center of gravity of the data cells.

20. A data recovery system comprising:

a first comparator comparing an input signal voltage to a first voltage, with the first comparator outputting a first comparator voltage corresponding to a logic 1 if the input signal voltage is greater than the first voltage and a voltage corresponding to a logic 0 if the input signal voltage is less than the first voltage;

a first latch periodically setting a first latch output to the first comparator voltage, the period being based on a first clock signal;

a second comparator comparing the input signal voltage to a second voltage, with the second comparator outputting a second comparator voltage corresponding to a logic 1 if the input signal voltage is greater than the second voltage and a voltage corresponding to a logic 0 if the input signal voltage is less than the second voltage;

a second latch periodically setting a second latch output to the second comparator voltage, the period being based on a second clock signal;

an error detector for detecting differences between the first latch output and the second latch output;

a controller for controlling the first voltage, the first clock signal, the second voltage, and the second clock signal, with the controller causing adjustment of at least one of either the first voltage and the first clock signal or the second voltage and the second clock signal based on the differences detected by the detector.

\* \* \* \* \*

UNITED STATES PATENT AND TRADEMARK OFFICE
CERTIFICATE OF CORRECTION

PATENT NO. : 6,178,213 B1
DATED : January 23, 2001
INVENTOR(S) : Gary D. McCormack et al.

It is certified that error appears in the above-identified patent and that said Letters Patent is hereby corrected as shown below:

Column 11,
Line 65, replace "date" with -- data --.

Signed and Sealed this

Fourth Day of March, 2003

JAMES E. ROGAN
*Director of the United States Patent and Trademark Office*